Dec. 29, 1970  D. ARMAN  3,550,180
CONNECTOR BETWEEN THE SWINGING SUPPORT AND THE SPATTLE
ARM IN A WINDSHIELD WIPER
Filed July 8, 1968

United States Patent Office

3,550,180
Patented Dec. 29, 1970

3,550,180
CONNECTOR BETWEEN THE SWINGING SUPPORT AND THE SPATTLE ARM IN A WINDSHIELD WIPER
Dario Arman, Strada Comunale Druento-Venaria, Druento, Torino, Italy
Filed July 8, 1968, Ser. No. 743,095
Claims priority, application Italy, Mar. 15, 1968, 807,923
Int. Cl. B60s 1/40
U.S. Cl. 15—250.32                             1 Claim

ABSTRACT OF THE DISCLOSURE

Novel connecting means between the swinging support and the spattle arm in a windshield wiper are provided, the connecting means consisting of a U-shaped flexible metal strip with anchor teeth to keep one of the extremities of the strip with the outer terminal of the support, the teeth being engaged with a seat formed therein.

---

In the windshield wipers and in the rear glass wipers of motor vehicles, the end of the shaft driven by the electric motor is angularly movable with a swinging reciprocating motion, and transmits its motion to the wiper spattle, or spattles, through a support or connecting means which engages the terminal of an arm which in turn supports at its opposite end a spattle with a cleaning blade, normally consisting of rubber.

As it is well known, the connection between the supporting means hinged to the angularly movable terminal of the shaft and the free terminal of the spattle arm is of great importance, because it must exhibit, in practice, certain definite characteristics. Thus, the connection must be effected by direct coupling of the terminal of the spattle arm within, and in juxtaposition with a longitudinal slot or seat formed in the terminal of the support means connected to the swinging shaft.

Furthermore, said connection, besides being easy to effect, must be detachable with equal facility, manually and with only a very gentle effort; the connection, however, must not be self-detachable because of stresses imparted by the normal operation of the corresponding spattle, or because of accidental stresses imparted to the spattle arm or to the support. Finally, the joined or connected parts must not have appreciable tolerances, to insure that the spattle can operate properly, and that the swinging system does not cause undesirable noise.

The scope of the improvement according to this invention is essentially to provide a novel connecting means characterized by an engaging means consisting of a flexible metal strip provided with anchor teeth to keep one of its extremities within the outer terminal of the support body, said teeth being engaged with a seat formed in the terminal of the support body.

The novel connecting means of the invention is further characterized in that the flexible metal strip, substantially U shaped and with asymmetrical arms, has one of its ends freely projecting beyond the open terminal of the support on which it is mounted; this projecting end provides the driving means. By acting on it with a simple and effortless pressure, it is possible to disengage the flexible metal strip from the terminal of the support on which it was originally mounted when inserting the toothed end of the metal strip. In the heretofore known supports the same disengaging operation is possible, instead, only by acting on the lower part of the support near the receiving end of the spattle arm, that is, in a position longitudinally opposed to the one of the present invention.

Figure 1:
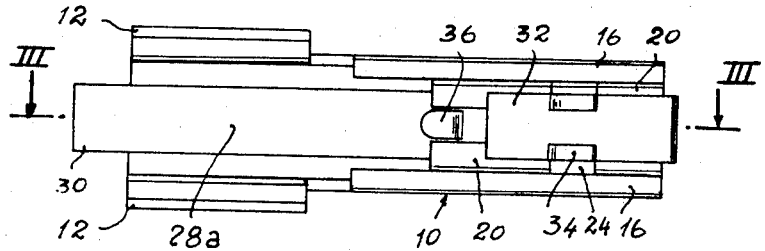
Figures 2, 3, 4:
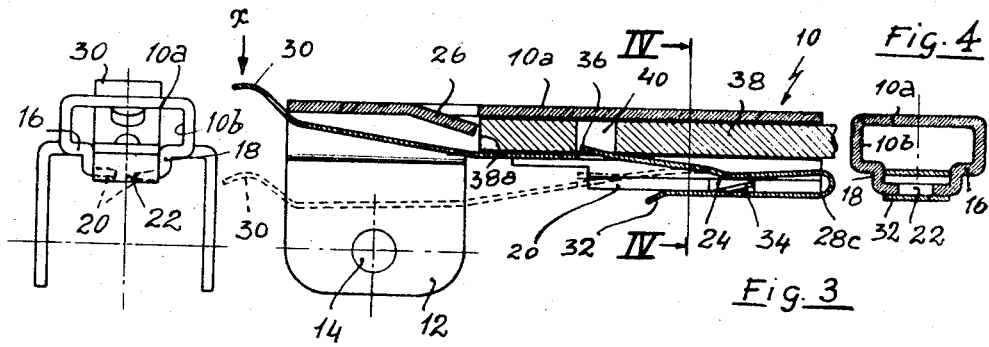
Figure 5:
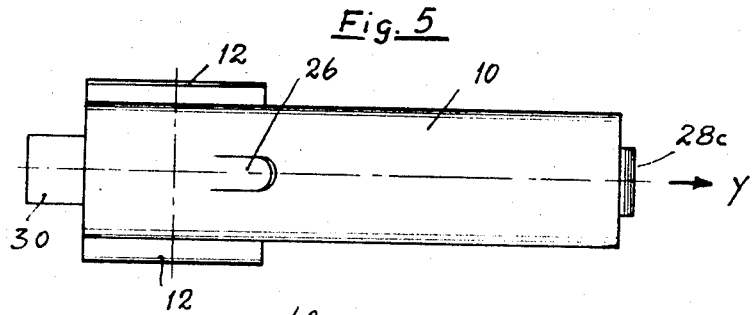
Figure 6A:
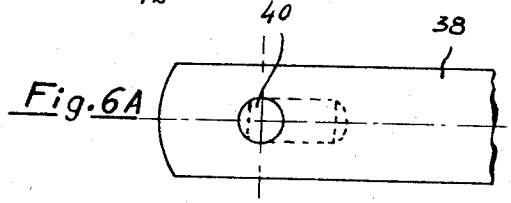
Figure 6B:
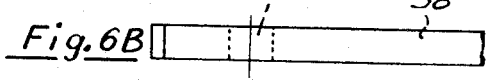
Figure 7:
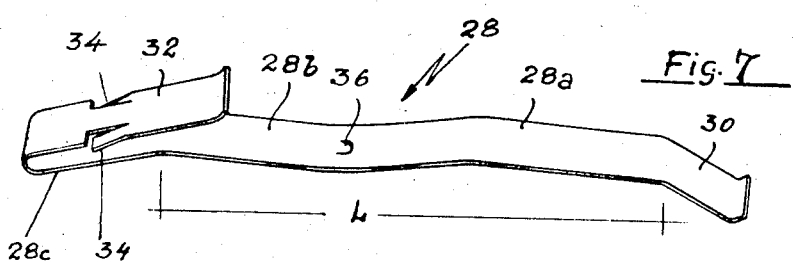

The invention will be more completely and clearly disclosed in the following details of the embodiments thereof, reference being made to the accompanying illustrative drawing, in which:

FIG. 1 is a bottom view of the support with the flexible metal strip;
FIG. 2 is a front view from the inserting side of the spattle arm;
FIG. 3 is a longitudinal, vertical section taken along the line III—III of FIG. 1;
FIG. 4 is a cross sectional view taken along the line IV—IV of FIG. 3;
FIG. 5 is a plan of the support with the metal strip;
FIGS. 6A and 6B are, respectively, fragmentary plan and side elevational views of one end of a support arm; and
FIG. 7 is a perspective view, on a different scale, of the flexible metal strip to be mounted within, and in relation to, the support.

Referring now to the drawings, the support is a bent metallic element 10 provided, at one of its extremities, with a solid coupling means for the angularly swinging hub or end of the windshield wiper driving shaft. As represented in the drawing, the coupling means consists of a pair of parallel lugs 12 provided with coaxial bores 14 for the crosswise insertion of a pin in said shaft. Different shapes than the one illustrated are, however, possible.

The support end opposed to said lugs has a pair of downwardly bent, symmetrical edges 16, having a short portion thereof parallel to the bottom 10a of the support, a second portion thereof vertical with respect to said bottom (see 18 in FIG. 2), and finally a third portion thereof 20 parallel to the first portion. Between the bent terminal facing edges 20 there is a free space 22 which terminates, near the free end of the support, into two slots 24 (FIGS. 1-3). In the bottom 10a of the element 10, there is provided, by partial shearing, a stop tooth 26, the end of which projects within the hollow body of the element 10.

Within and in relationship to the support, there is mounted the flexible metal strip 28 (FIG. 7) which has its extremity 30 properly bent so as to provide the driving means for the metal strip and its opposite extremity 32 substantially U shaped and provided with a pair of solid teeth 34, so as to engage the slot 24 of the support 10.

In addition to its bent extremities, the flexible metal strip 28 comprises a substantially flat and straight portion 28a ending in a slightly bent section 28b which becomes, at 28, the first arm of the U-shaped extremity, the second arm thereof being item 32.

In the section numbered 28b, by partial shearing of the metal strip, there is formed a tooth 36, which extends towards the bend of the extremity 30, that is, towards the upper part of the metal strip, as seen in FIG. 3.

As it can be seen in the drawings, the flexible metal strip 28 is mounted longitudinally within the bent element 10, in such a way that its extremity 32 engages the ends of edges 20. The teeth 34 of the strip's U-shaped terminal do engage, in this condition, the slots 24 of the edges 20, while the extremity 30 projects longitudinally from the opposite end of the support 10, thus providing an easily driveable control means to elastically deflect the length L (FIG. 7) of the metal strip.

From the above description, the use and operation of the connection with terminal 38 of the spattle arm, may be visualized as follows:

The spattle support arm or terminal 38, is provided with a recess 40 (FIG. 6), of any conventional shape capable of being engaged by the tooth 36; consequently, when the flexible strip 28 is mounted within the hollow body of the support 10, as seen in FIG. 3, the end of the spattle support arm 38 is longitudinally fitted within the hollow body. In this position, the terminal edge 38a abuts and is stopped against the tooth 26 projecting within the hollow body of the support 10, and the tooth 36 of the flexible strip 28 is fitted within the appropriately shaped recess 40, facing in a direction opposite to that of the tooth 26. The end of said arm 38 becomes, in such a way, positively fixed against the two possible longitudinal movements, that is, it can neither advance towards the left end of the support 10, because of the presence of tooth 26 in the support, nor can it move in the opposite direction, because of the presence of tooth 36 engaging the recess 40.

To free the terminal of the support arm 38 from the support 10, one needs but to exert a gentle pressure on the terminal 30 of the flexible strip 28 in the direction shown by the arrow X in FIG. 3. In this way, the strip or spring 28 moves from the position shown by the full lines of FIG. 3 to the position shown by the broken lines. Consequently, the tooth 36 is disengaged from the recess 40 and frees the terminal end of the support arm 38, which can be withdrawn from the bent support by a simple and gentle pulling action in the direction of the arrow Y (FIG. 5).

From the above description, it is clear that, the terminal end of the support arm 38 is contained and guided within the wider portion of the hollow body of the support 10 formed by the inner surfaces of edges 16. From the inner surface of the upper part 10a and from the inner surfaces of edges 10b (FIG. 2) flexible strip 28 can be depressed with respect to the seat of the support arm and is limited by the edges 20 of the support 10. In practice, it is very important that, in the connection, according to the invention, the seat of the terminal of the support arm be clearly separated from the seat of the connecting flexible metal strip, and consequently that said strip does not guide at all the terminal of the arm or rod within, and in relation to the connecting means consisting of the support 10. The strip, as its only function, should provide an effective engaging means, because of the fitting of the tooth 36 within, and with regard to the seat 40.

Another noticeable characteristic of this connection is the fact that the stopping of the support arm 38 against sliding in the supporting 10, is due to the tooth 26, integral with said support.

The above described detachable connection of the invention is very effective and practical, and it is consequently capable of utilization on every kind of windshield wiper, for either light or heavy motor vehicles.

What I claim is:

1. In a windshield wiper for a motor vehicle, the improvement in the connection between the wiper support and the terminal of the spattle arm which comprises a bet support member for longitudinally receiving the spattle arm terminal, the cross section of said bent support member, in the region of the spattle terminal, comprising a base consisting of the upper part of said support member, a pair of parallel sides that are vertically oriented with respect to said base and which includes seats and opposite, symmetrical retaining edges that are parellel to said base and parallel to said support member; and a flexible metal strip positioned within said support member, said flexible metal strip including a connecting tooth for engaging a recess formed in said spattle arm, said flexible metal strip being substantially U-shaped and having a bent end, said flexible metal strip further including two engaging teeth on said bent end, said teeth fitting within said seats formed in said parallel side edges of said bent support member, the other end of said flexible metal strip extending longitudinally across the hollow body of said bent support member and including an end extending beyond said bent support member, said last mentioned end of said flexible metal strip being displaceable to thereby release said flexible metal strip.

References Cited
FOREIGN PATENTS

| 1,058,382 | 5/1959 | Germany. |
| 878,164 | 9/1961 | Great Britain. |
| 920,059 | 3/1963 | Great Britain. |

ROBERT W. MICHELL, Primary Examiner